United States Patent
Narayanasamy et al.

(10) Patent No.: US 10,715,601 B2
(45) Date of Patent: Jul. 14, 2020

(54) ENHANCED DEPLOYMENT OF APPLICATIONS IN AIRBORNE AND SPACEBORNE NODES

(71) Applicant: Vector Launch Inc., Tucson, AZ (US)

(72) Inventors: Senthilkumar Narayanasamy, San Jose, CA (US); John Edward Metzger, Campbell, CA (US); Shaun B. Coleman, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/199,997

(22) Filed: Nov. 26, 2018

(65) Prior Publication Data

US 2020/0169608 A1 May 28, 2020

(51) Int. Cl.
*H04L 29/08* (2006.01)
*H04L 12/26* (2006.01)

(52) U.S. Cl.
CPC .......... *H04L 67/12* (2013.01); *H04L 43/0805* (2013.01); *H04L 43/0852* (2013.01)

(58) Field of Classification Search
CPC . G06F 8/60; G06F 8/71; G06F 3/0482; G06F 9/445
See application file for complete search history.

(56) References Cited

U.S. PATENT DOCUMENTS

| | | | | |
|---|---|---|---|---|
| 9,338,074 B2 * | 5/2016 | Puthenpura | ......... | H04L 43/0888 |
| 9,722,692 B1 * | 8/2017 | Coleman | ............ | G06K 9/00677 |
| 9,740,465 B1 * | 8/2017 | Coleman | .................... | G06F 8/71 |
| 2008/0247351 A1 * | 10/2008 | Dankberg | .......... | H04B 7/18534 |
| | | | | 370/316 |
| 2012/0076016 A1 * | 3/2012 | Robbins | .................. | H04L 43/50 |
| | | | | 370/252 |
| 2012/0177086 A1 * | 7/2012 | Drago | ................ | H04B 7/18515 |
| | | | | 375/219 |
| 2013/0035115 A1 * | 2/2013 | Lindegren | ............. | H04W 28/22 |
| | | | | 455/456.3 |
| 2013/0185021 A1 * | 7/2013 | Addison | ............. | G06F 11/3428 |
| | | | | 702/186 |
| 2013/0322329 A1 * | 12/2013 | Visuri | .................... | H04W 48/16 |
| | | | | 370/328 |
| 2014/0222472 A1 * | 8/2014 | Platzer | ................... | G06Q 10/02 |
| | | | | 705/5 |
| 2015/0199197 A1 * | 7/2015 | Maes | ........................ | G06F 8/71 |
| | | | | 717/122 |
| 2015/0215030 A1 * | 7/2015 | Moore, III | ......... | H04B 7/18521 |
| | | | | 455/428 |
| 2015/0222350 A1 * | 8/2015 | Shi | ..................... | H04B 7/18506 |
| | | | | 342/367 |
| 2015/0318916 A1 | 11/2015 | Gopal et al. | | |
| 2016/0037434 A1 * | 2/2016 | Gopal | ................. | H04W 40/246 |
| | | | | 370/316 |

(Continued)

*Primary Examiner* — Benjamin M Thieu (57) ABSTRACT

Systems, methods, and software described herein provide enhancements for the deployment of applications in an airborne and spaceborne system. In one implementation, when an application is to be deployed to the system, the system identifies a subset of physical nodes with sensor data associated with the application. Once identified, the system determines accessibility data for the physical nodes of the system to access the sensor data associated with the application and deploys the application to at least one physical node based on the accessibility data.

20 Claims, 7 Drawing Sheets

(56) References Cited

U.S. PATENT DOCUMENTS

2016/0205654 A1* 7/2016 Robinson, Jr. ........ H04W 4/029
  455/456.3
2017/0076057 A1* 3/2017 Burton .................. G16H 10/60
2017/0144773 A1* 5/2017 Raman .................. B64D 45/00
2017/0300654 A1* 10/2017 Stein .................... A61B 5/0022

* cited by examiner

ENHANCED DEPLOYMENT OF APPLICATIONS IN AIRBORNE AND SPACEBORNE NODES

BACKGROUND

Satellites and aircraft can be deployed to provide various task-based operations, such as military and civilian observation operations, communications operations, navigation operations, weather operations, and research operations. Satellites and aircraft can include various sensors and communication equipment that are used to perform these desired tasks. For example, a weather satellite may include one or more cameras or imaging sensors that can be used to take images of Earth, and communication equipment that can be used to communicate the images to a control system on Earth. An aircraft drone might include cameras for imaging portions of the Earth and relaying those images to a control station or system. Although satellites and aircraft can both be configured to perform specialized operations, difficulties can arise from the movement of the satellites and aircraft in gathering the required data for the required operations.

Overview

The technology described herein enhances the deployment of tenant applications in airborne and spaceborne nodes. In on implementation, a system with a plurality of physical nodes collects sensor data using a plurality of sensors. The system further identifies one or more physical nodes in the plurality of physical nodes with sensor data associated with an application and determines accessibility data for the plurality of physical nodes to access the sensor data for the application. Based on the accessibility data, the system may deploy the application to at least one physical node of the plurality of physical nodes.

This Overview is provided to introduce a selection of concepts in a simplified form that are further described below in the Technical Disclosure. The Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
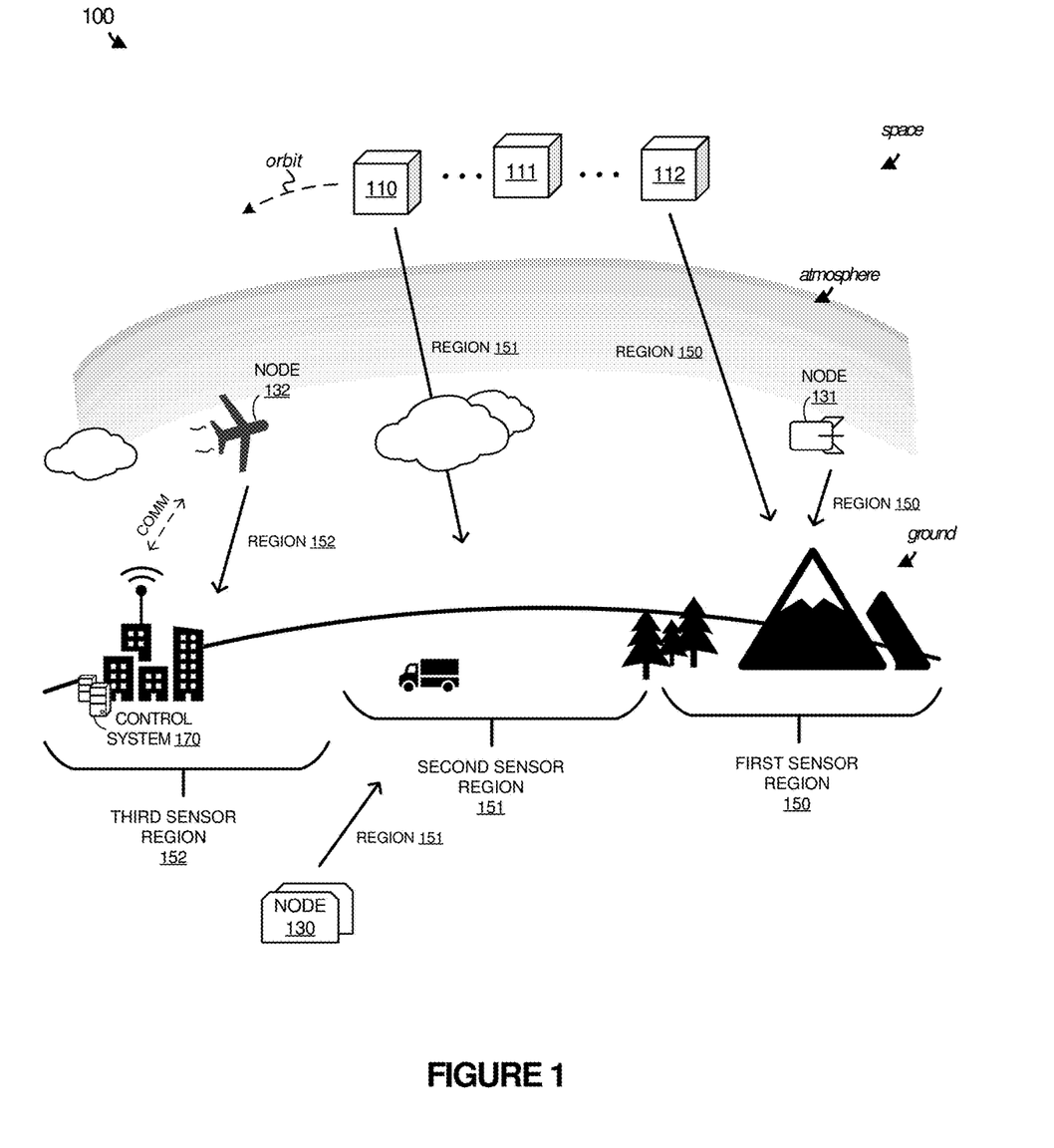
FIG. 1 illustrates a system to manage the deployment of applications to physical nodes according to an implementation.

FIG. 1 illustrates a system 100 to manage the deployment of applications to physical nodes according to an implementation. System 100 includes physical nodes 110-112 and 130-132, and control system 170. Physical nodes 110-112 are representative of spaceborne nodes that may comprise satellites, shuttles, capsules, or other similar spaceborne entities. Physical nodes 131-132 are representative of atmospheric nodes, such as aircraft, airplanes, drones, balloons, or some other similar airborne objects capable of data processing and/or gathering sensor observation data. Physical nodes 131-132 may be mobile or tethered. For example, a balloon device might be mobile, tethered, or both. Physical node 130 is representative of a surface-based data observation node. In some examples, physical node 130 may be mobile and comprise a car, truck, ship, vessel, vehicle, train, or other surface or subsurface-going vessel. In other examples, physical node 130 may be stationary and comprise a building, antenna array, tower, or other structure. Any number of satellite nodes, atmospheric nodes, and surface nodes may be employed.

In operation, physical nodes 110-112, and 130-132 are deployed to provide various operations for different tenants of system 100. These operations may include military, commercial, government, and civilian observation or monitoring operations, communications operations, navigation operations, weather operations, and research operations. In implementing the operations for the various tenants, control system 170 may provide an interface to the tenants, permitting the tenants to define target requirements and applications for the required operations. In some implementations, the target requirements may comprise processing resource requirements (type of processor, quantity of cores, and the like), storage requirements (quantity of storage, type of storage, and the like), communication requirements (bandwidth, throughput, target frequencies, and the like), sensor requirements (sensor type, sensor quality, and the like), geographic location requirements (defined objects and/or geographic regions of interest), or some other similar requirement. From the target requirements, an application may be developed that uses the target requirements to provide the desired functionality. This application may be deployed as a standalone application or may be deployed as a virtual machine, container, or some other virtualized endpoint that can execute on one or more physical nodes. As an example, a tenant may generate an application that requires at least a minimum quality or types of imaging sensors, at least a minimum quantity of processing resources, and at least a minimum amount of storage. An example application may be used to monitor vehicular traffic within a defined geographic region, where the application may use the imaging data to identify particular traits in the traffic and report the information to control system 170.

In some implementations, when an application is deployed in system 100, the application may be deployed to at least one physical node based on data accessibility for the application. In particular, due to the movement of physical nodes within system 100, the relevant sensor data for the application can be gathered from any number of sensors on physical nodes 110-112 or 130-132. As an example, due to the orbit of sensors 110-112, an application may obtain data from at least one sensor on physical node 110 for an object of interest in one of sensor regions 150-152 during a first time period, but may obtain data from physical node 112 during a second time period. Advantageously, system 100 may determine accessibility data related to accessing the sensor data to ensure efficient processing of the required sensor data.

For example, if an application were currently executing on physical node 110, but required data from first sensor region 150, it may be inefficient to continue the execution of the application on physical node 110. Instead, the platform provided by physical nodes 110-112 and 130-132 may determine the physical nodes that are currently gathering the required data and may determine accessibility data for physical nodes to access and process the required data. Thus, the application may migrate, in some examples as a stateful virtual node, to physical node 112, wherein the data may be more efficient to process. In determining the accessibility data for accessing data related to an application, the physical node platform may consider latency in data requests, data throughput from the source of the data to the potential physical node that will process the data, next hop reachability between physical nodes, the communication resource availability of the potential physical node that will process the data, or some other similar accessibility data. From the accessibility data, the physical node platform may select a physical node (or nodes for the application) and deploy the application on that node, wherein the deployment may comprise a first initiation of the application on a physical node or may comprise a migration from another physical node currently executing the application.

Figure 2:
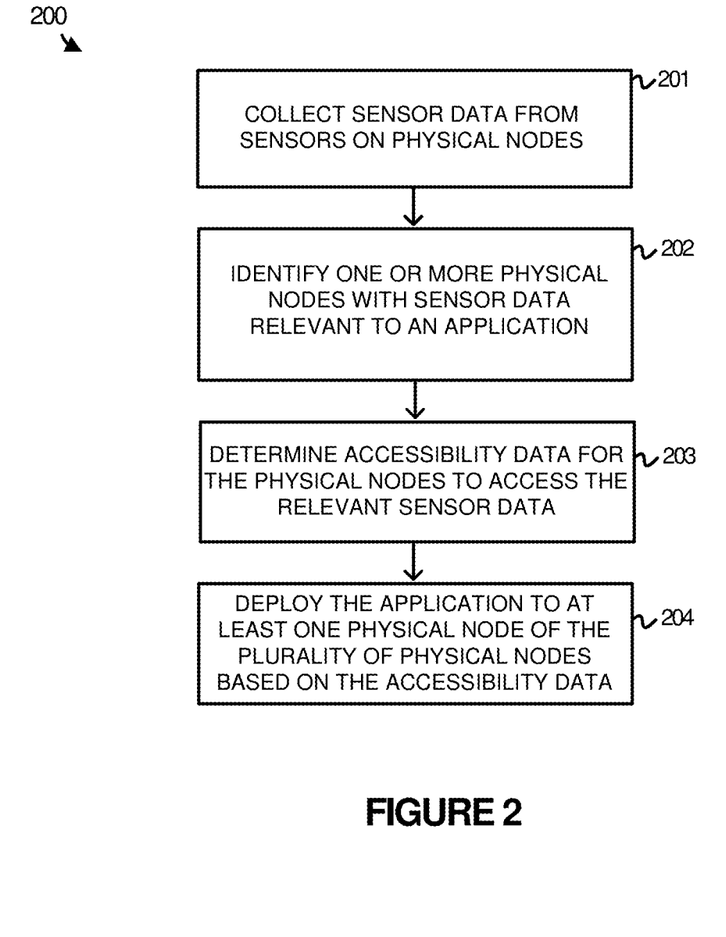
FIG. 2 illustrates an operation to deploy applications to physical nodes according to an implementation.

FIG. 2 illustrates an operation 200 of a system to manage logical sensors according to an implementation. The processes of operation 200 are referenced parenthetically in the paragraphs that follow with reference to elements of system 100 of FIG. 1. Operation 200 may execute on control system 170 and/or one or more physical nodes 110-112 and 130-132 in system 100.

As depicted, operation 200 includes collecting (201) sensor data from sensors on physical nodes, wherein the sensors may comprise motion sensors, imaging sensors, heat and/or thermal sensors, electromagnetic spectrum sensors, laser sensors, lidar or radar sensors, proximity sensors, seismic sensors, meteorological sensors, chemical/radiation/nuclear/electronic/signal sensors, or some other similar sensors. As the data is gathered, operation 200 may identify (202) one or more physical nodes with sensor data relevant to an application. As an example, an application to be deployed in sensor region 151, may require various sensor data from physical nodes with sensors that monitor second sensor region 151. Consequently, out of physical nodes 110-112 and 130-132, physical nodes 130 and 110 may be identified as obtaining required data for the application. Once the one or more physical nodes are identified that gather sensor data related to the application are identified, operation 200 may determine (203) accessibility data for the physical nodes to access the sensor data associated with the application. This accessibility data may be related to latency in obtaining the relevant sensor data, communication limitations of the physical nodes, data throughput information for the physical nodes, next hop availability or distance data, or some other accessibility data related to obtaining and providing the required sensor data to a physical node. Referring again to an application with interest in second sensor region 151, physical nodes 110-112 and 130-132 may be evaluated in their ability to access and provide data to an application executing on each of physical nodes 110-112 and 130-132. Specifically, physical nodes 110-112 and 130-132 may be evaluated to determine the accessibility data related to obtaining data from physical node 110 and physical node 130 that provides sensor data related to second sensor region 151.

In some implementations, in determining the accessibility data, the physical nodes of system 100 may use test packets or communications to determine the accessibility to the required data. Once determined, the accessibility data may be communicated to a control system or another physical node to determine the physical node for the applications.

After the accessibility data is determined for physical nodes 110-112 and 130-132, operation 200 may deploy (204) the application to at least one physical node of the plurality of physical nodes based on the accessibility data. In some implementations, the physical node that is selected may comprise a physical node that is gathering the sensor data for the application. In other implementations, the physical node that is selected may comprise a physical node that is not directly gathering the sensor data for the application. For example, physical node 111 may be selected for an application with an object of interest in second sensor region 151, even when physical node 111 does not collect the sensor data directly from the sensors. Although demonstrated in the previous example as selecting a single physical node for the application, some applications may be capable of execution over multiple physical nodes. For example, a first application component may be used in processing first sensor data, while a second application component may be used in processing second sensor data. Consequently, the first application component may be allocated to a first physical node with accessibility to the data for the first application component, and the second application component may be allocated to a second physical node with accessibility to the data for the second application component.

In some implementations, in selecting the physical node (or nodes) for deploying an application, the physical node platform may consider various other factors, including the resources required for the application. These resource requirements for the application may comprise processing resource requirements, storage resource requirements, communication resource requirements, or some other similar resource requirement. Accordingly, although a physical node may have the best accessibility to the required sensor data, another node may be selected based on the aforementioned factors. In addition to the physical resource requirements of the application, system 100 may further use quality of service to determine where an application should be deployed. This quality of service associated with the application may define minimum accessibility requirements of the application, processing requirements of the application, or some other similar quality of service requirement. As a result, when the application is deployed, the application may only be deployed to a physical node capable of satisfying the quality of service requirements of the application.

In some examples, when applications are deployed in system 100, the applications may migrate between the physical nodes based on the accessibility information related to accessing the required data. For example, although an application may initially be deployed in physical node 110 to monitor objects of interest in second sensor region 151, the application may migrate to other physical nodes, such as physical node 111 or physical 112 due to the orbit and movement of the physical nodes. In determining when to migrate an application, the physical nodes or control system 170 may determine when the data accessibility for a current node fails to meet minimum criteria. The minimum criteria may include latency, data throughput, a quantity of next hops to obtain the required data, or some other similar criteria related to the accessibility of data for the application. Once the criteria are not met for the application, the physical nodes or control system 170 may determine data accessibility to the required data by the other physical nodes in system 100. From the data accessibility, a new physical node may be determined for the application and the application can be migrated to the new physical node. In some implementations, an image of the application may be provided to the new physical node prior to the execution of the application. As a result, only stateful data, such as processed sensor data, identified objects of interest, or some other similar stateful data may be supplied to the new physical node. Thus, if the application were to be migrated from physical node 110 to physical node 112, the image for the application (e.g., files, directories, etc.) may be provided to physical node 112 from physical node 110, another physical node in system 100, or control system 170. Once provided, any state information may be communicated to physical node 112, permitting the application to execute using the same data as the previous version of the application. Thus, physical node 110 may provide information about processed sensor data, objects of interest, state information about the processing of data, or some other similar information.

Although not demonstrated in the example of system 100, the selection of the sensor data that is relevant to an application may be based on the quality provided by the sensors. For example, sensors on both physical node 110 and physical node 111 may gather sensor data for second sensor region 151, wherein the sensor data from both of the physical nodes may be capable of supporting the operations of an application. As a result, physical nodes 110-111, another physical node, or control system 170 may determine the sensor data that is better quality and use that sensor data to determine the accessibility data. Thus, if physical nodes 110-111 were both gathering imaging data, and physical node 110 were obstructed due to cloud cover, then physical node 111 may be selected as obtaining the sensor data that is relevant to the application. Once physical node 111 is identified, then the accessibility data may be determined and used in selecting a physical node to host the application.

In some examples, an application may require data from multiple sensors. For instance, an application may require imaging sensor data from physical node 110 and physical node 111. As a result, when determining the physical node or nodes for the application, system 100 may consider the accessibility to the data obtained by both of the physical nodes. Additionally, in some examples, data from multiple sensors may be combined into composite data, and provided to an application as though the data were obtained from a single sensor. Thus, imaging data may be obtained from physical node 110 and physical node 111 and used to generate composite data that can be provided to the application as though the data were obtained from a single sensor. In determining the physical node or nodes for deployment of the application, system 100 may consider the accessibility to the composite data that may be generated on physical node 110, physical node 111, or some other element in system 100.

In some implementations, to secure each of the applications, the applications may be segregated or secured from other applications executing in the platform. This security may be provided based on permissions, encryption, or some other similar security measure. As an example, when an application is deployed to one or more physical nodes, the application may be provided with permissions to access required storage, sensor resources, or other similar resources. In accessing the required resources, the data (both stored and from the sensors) may be encrypted by the supporting platform, and the application may be provided with credentials or keys to decrypt the data for processing. Thus, even if another application obtained improper data from a sensor, the application would be incapable of processing the data without the required key.

Figure 3:
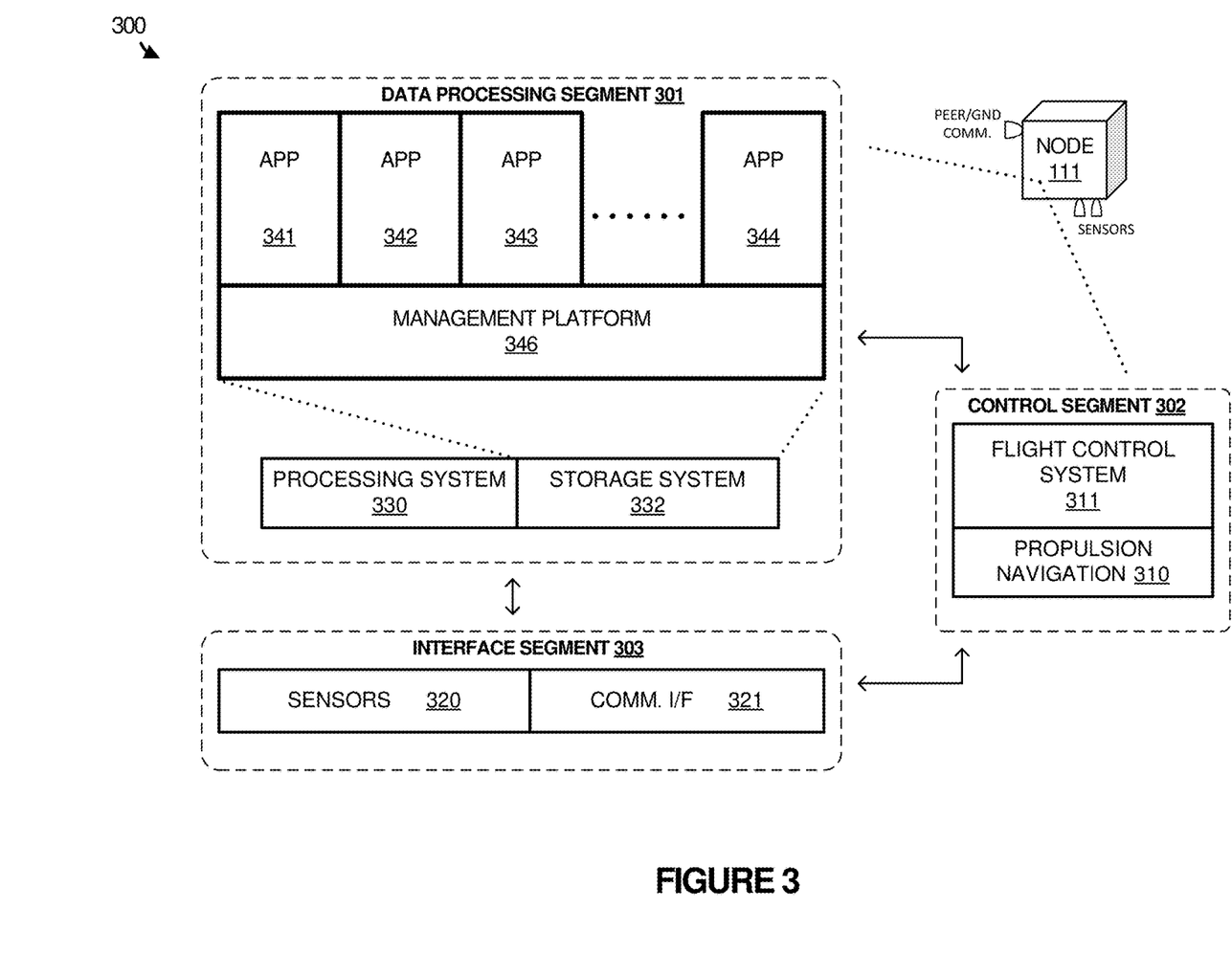
FIG. 3 illustrates an expanded view of a physical node according to an implementation.

FIG. 3 illustrates an expanded view 300 of physical node 111 of FIG. 1 according to an implementation. Physical node 111 can be an example of any of nodes 110-112 and 130-132 of FIG. 1, although variations are possible. Physical node 111 includes data processing segment 301, control segment 302, and interface segment 303. Data processing segment includes processing system 330 and storage system 332 that stores applications 341-344 that execute via management platform 346. Control segment includes flight control system 311 and propulsion navigation 310. Interface segment 303 includes sensors 320 and communication interface 321.

As described herein, physical nodes in an observation system may provide a platform for various tenants to deploy and execute applications that provide various operations. These operations may include military and civilian observation operations, communications operations, navigation operations, weather operations, and research operations. As depicted in expanded view 300, data processing system 301 includes processing system 330 and storage system 332, where storage system 332 stores management platform 346 (operating system, hypervisor, or the like), and applications 341-344. Applications 341-344 execute on top of management platform 346 and may operate inside of one or more logical nodes, where the logical nodes may comprise containers, virtual machines, or some other similar virtualized element.

In providing the required operations, each of applications 341-344 may access data obtained from one or more sensors 320 or sensors on other physical nodes in the system. The sensors may include motion sensors, imaging sensors, heat and/or thermal sensors, electromagnetic spectrum sensors, laser sensors, lidar or radar sensors, proximity sensors, seismic sensors, meteorological sensors, chemical/radiation/nuclear/electronic/signal sensors, or some other similar sensors. When deploying the applications, which may correspond to different tenants of the physical node system, one or more physical nodes or the control system may determine which of the physical nodes are gathering data for each of the applications and deploy the applications to physical nodes based on the accessibility of the required sensor data. In some implementations, the accessibility data may comprise latency, data throughput, or some other similar information related to the accessibility of the data. For example, an application may require sensor data from a sensor on a first physical node, wherein the data may be required due to a region of interest to the application, an object of interest identified by the first physical node for the application, or may be identified using some other similar information. Once the physical nodes with the sensor data are identified, accessibility data for accessing the data from the physical nodes of the system may be determined. This accessibility data may be determined using management platform 346 in some examples, wherein test packets or packets related to other applications may be used in determining the resources available to obtain the required data.

After determining the accessibility data, system 100 will determine a physical node of the available physical nodes to support the execution of the application based on the accessibility data. As an example, application 341 may be initiated on physical node 111 due to the data related to the application being obtained from sensors 320 or from sensors on another node with available communication channels to physical node 111. In some implementations, the physical nodes of the system may each determine their corresponding accessibility data and communicate the accessibility data to a centralized physical node or control system to determine the required physical node for the application. In other implementations, the physical nodes may each process the accessibility data in parallel to select a physical node to execute the application.

In some implementations, in addition to using the accessibility data in determining the execution location for an application, system 100 may further use information about other resources to determine the physical node for the application. This information may include processing requirements, storage requirements, communication requirements, or some other similar requirements associated with the application. As a result, even if a physical node may provide the best accessibility to sensor data for an application, the application may be deployed on another physical node that can support the other requirements of the application.

In addition to the data processing operations provided in data processing segment 301, physical node 111 further includes control segment 302. Control segment 302, which may be communicatively linked to data processing segment 301 and interface segment 303, is responsible for logistical control elements of physical node 111. The operations may include managing the deployment of solar panels on a satellite, managing the positioning of a satellite with regards to the Earth or the sun, providing a spaceborne sensor pointing and control, autonomously managing target decks or tasking priorities, or any other similar operation. When physical node 111 comprises an aircraft or atmospheric node, then control elements can include flight control systems, power systems, navigation systems, sensor pointing and control, autonomously managing target decks or tasking priorities, among other elements. When physical node 111 comprises a surface node, then control elements can include propulsion elements, power systems, powertrains, navigation systems, and the like. A flight control system might not be employed in all node types, such as stationary surface nodes.

In at least one example, flight control system 311 may monitor for requests from data processing segment 301 and determine whether the node can accommodate the request. As an example, application 344 may require movement of a satellite, aircraft, or vehicle to provide an operation with respect to a sensor of sensors 320. Control segment 302 may determine whether the movement is permitted and implement the required action if permitted. The determination of whether an action is permitted by control segment 302 may be determined based on other applications executing on the node, based on flight requirements of the node, or based on some other similar mechanism.

Also depicted in expanded view 300 is interface segment 303 with sensors 320 and communication interface 321. Interface segment 303 may be communicatively coupled to data processing segment 301 and control segment 302. Sensors 320 may comprise imaging sensors, heat sensors, proximity sensors, light sensors, or some other similar type of sensor. Sensors 320 may be accessible to applications 341-344 executing in data processing segment 301 and may further be accessible to one or more other applications executing on other nodes of the system. In at least one implementation, each of the sensors may be allocated to one or more logical nodes, where the logical nodes may each access the senor during defined time periods, may jointly obtain data derived from the sensor at the same time (e.g. all logical nodes can access the same imaging data), or may be provided access to sensors at some other interval. In addition to sensors 320, interface segment 303 further includes communication interface 321 that may be used to communicate with other physical nodes and/or management systems for system 100. In some examples, communication interface 321 may work with management platform 346 to control the application communications. Thus, if application 341 required a communication with another physical node to obtain sensor data from the physical node, communication interface 321 may forward the communication to the appropriate node and obtain the data from the node.

While demonstrated in the example of expanded view 300 using a satellite node, physical nodes may be represented in a variety of forms. These physical nodes may comprise airplanes, drones, balloons, land vehicles (cars, trucks, trains, and the like), water vehicles, or some other similar physical node. These physical nodes may include a data processing segment capable of providing a platform for the applications executing thereon, may comprise a communication interface to communicate with other physical nodes and/or control systems, and may further comprise one or more sensors capable of gathering required data for the applications executing thereon.

Figure 4:
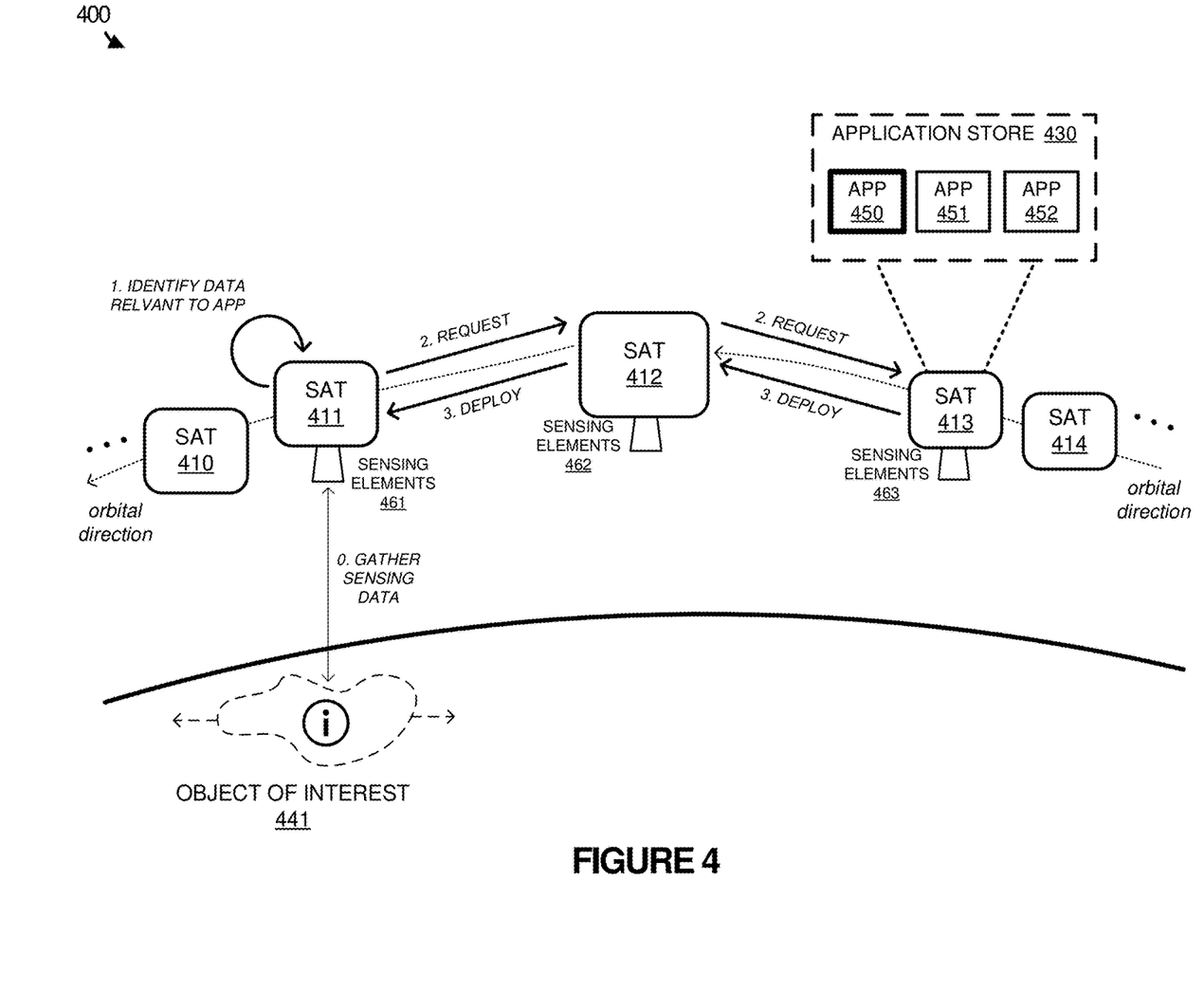
FIG. 4 illustrates an operational scenario of deploying an application based on sensor data according to an implementation.

FIG. 4 illustrates an operational scenario 400 of deploying an application based on sensor data according to an implementation. Operational scenario 400 includes satellites 410-414, and object of interest 441. Satellites 411-413 includes sensing elements 461-463, and satellite 413 further includes application store 430 with applications 450-452.

As depicted, at step 0, satellite 411 uses sensing elements 461 to gather sensing data related to object of interest 441 and identifies, at step 1, that the sensor data is relevant to the deployment of application 450. In some implementations, the relevancy of the data to an application may be determined based on the geographic region of coverage for satellite 411, may be determined based on an object of interest identified by a process executing on satellite 411 that relates to application 450, or may be determined using some other relevancy operation.

Once data is identified as relevant to the application, one or more satellites of the system or a control system may determine accessibility data related to the application being able to obtain and process the required data. The accessibility data may be based on the on the bandwidth of the satellite to obtain the required data for the application, the latency in obtaining the required data, cache storage for the sensor data, or some other similar accessibility data. In the present implementation, the system determines that satellite 411 should be used in processing application 450. As a result, satellite 411 may generate a request, at step 2, directed to satellite 413 to obtain application 450, and satellite 413 may deploy, at step 3, the application to satellite 411 for execution.

Although demonstrated in the example of FIG. 4 as providing the application from another satellite, a ground system may also be used in deploying the application. For example, for the initial deployment of an application, the ground system may communicate the application to the satellites for execution on at least one of the satellites. In some implementations, application 450 may initially execute on satellite 413. During the execution, it may be determined that the accessibility of the data fails to meet accessibility criteria, which triggers the identification of a new physical node for the application.

While described in the example of FIG. 4 as determining the physical node for the application based on the accessibility of the data, additional factors may be used in determining the physical node for the deployment of the application. These factors may include the processing resources available for the application, the storage resources available for the application, the communication resources available for the application, or some other similar factor. These factors may be compared to requirements of the application to determine if the physical node is capable of supporting the application. Thus, when an application is deployed, the tenant associated with the application may define a quality of service or minimum requirements of the application, and the system may identify the physical node to support the application based on the quality of service requirements for the application.

Figure 5:
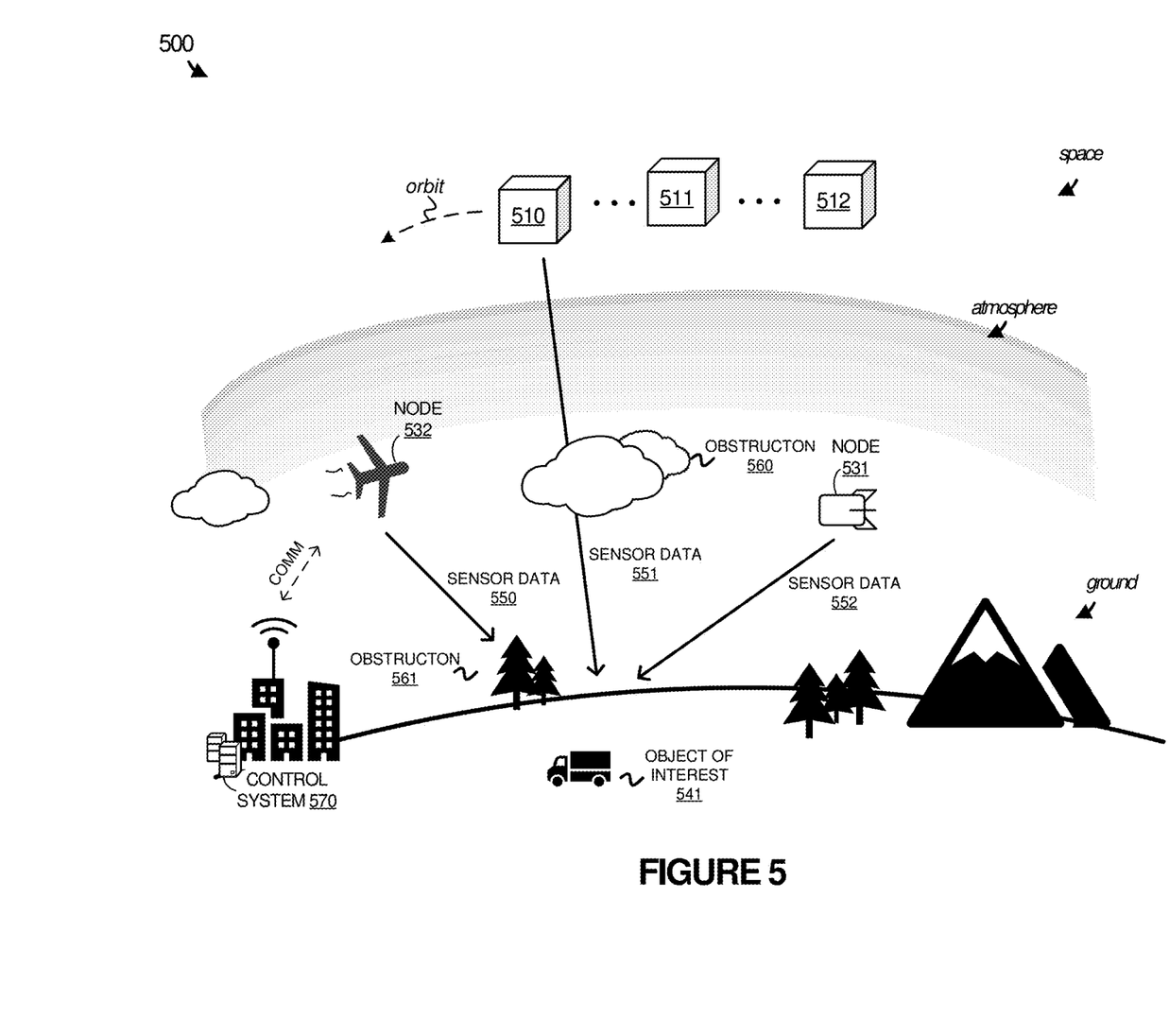
FIG. 5 illustrates an operational scenario of selecting sensor data for an application according to an implementation.

FIG. 5 illustrates an operational scenario 500 of selecting sensor data for an application according to an implementation. Operational scenario 500 includes physical node 510-512 and 531-532, control system 570, object of interest 541, and obstructions 560-561.

In operation, physical nodes 510 and 531-532 collect sensor data 550-552 related to object of interest 541 for an application executing on a physical node of the system. This sensor data may comprise imaging data, light data, or some other similar sensor data. In collecting the sensor data, the physical nodes and control system 570 may determine which of the physical nodes 510 and 531-532 provide the best quality of sensor data for object of interest 541. Thus, using an imaging sensor as an example, the system may determine which of the sensors provides the best image of object of interest 541. Here, the sensor for physical node 510 is obstructed by obstruction 560 and the sensor for physical node 532 is obstructed by obstruction 561. As a result, the system may determine that physical node 531 provides the best sensor data related to object of interest 541.

In some implementations, in determining which of the physical nodes should provide the required sensor data, the physical sensor system may process the data to determine which of the sensors provide the best quality of service. The processing may include identifying if any obstructions are in the sensor data, the format of the sensor data, the quantity of data related to the object of interest from the sensor, or some other similar processing.

Once the sensor that provides the highest quality of service is identified (or the physical node that provides at least the minimum quality of service), the system may determine the physical node that should be used in processing the data. In at least one implementation, similar to the operations described in FIG. 1-4, the system may determine a physical node of the plurality of physical nodes to support the application based on accessibility data related accessing the required sensor data from the various physical nodes of the system with sensor data related to the application. Further, the system may consider other factors in determining the physical node to support the application including processing requirements of the application, storage requirements of the application, communication requirements of the application, and the availability of the corresponding resources from the physical nodes.

Figure 6:
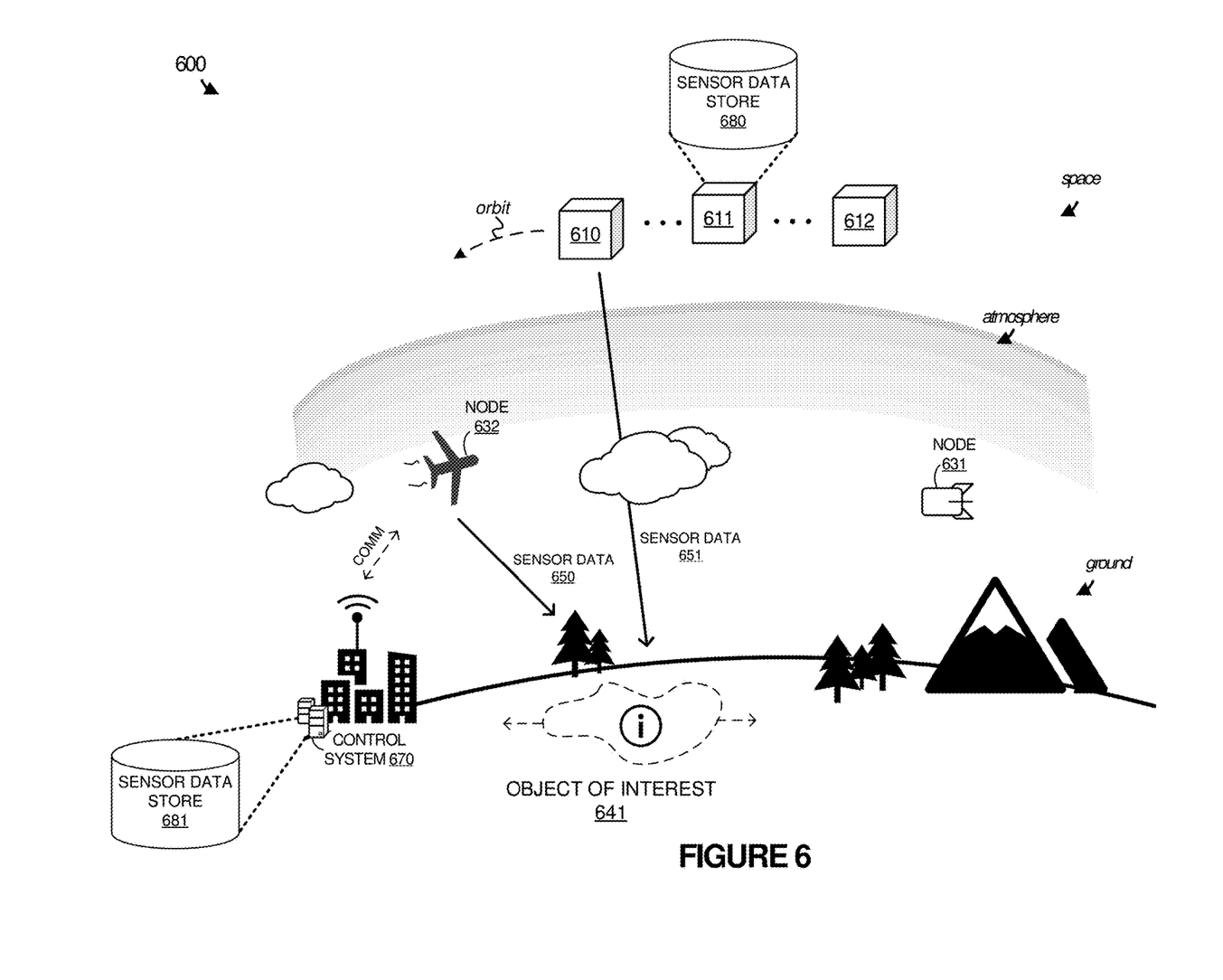
FIG. 6 illustrates an operational scenario of deploying an application based on sensor data according to an implementation.

FIG. 6 illustrates an operational scenario 600 of deploying an application based on sensor data according to an implementation. Operational scenario 600 includes physical nodes 610-612 and 631-632, control system 670, and object of interest 641. Physical node 611 maintains sensor data store 680 and control system 670 maintains sensor data store 681. Physical node 610 obtains sensor 651 for object of interest 641 and physical node 632 obtains different sensor data 650 for object of interest 641.

In operation, physical nodes 610-612 and 631-632 are deployed as a system to provide a platform form various applications. In deploying the applications, the physical nodes may determine which physical nodes are capable of obtaining the sensor data of interest and may deploy the applications based on the accessibility of the sensor data of interest. Here, in addition to the accessibility to real-time data obtained from the sensors of the physical nodes 610-612 and 631-632, the system, which includes control system 670, may determine the accessibility to sensor data that is stored in at least one of sensor data store 680 or 681. As an example, an application may be configured to process imaging data related to object of interest 641. During the execution of the application, the application may determine that previously obtained data, or data that is stored in one of sensor data store 680 or sensor data store 681, is required to provide a desired operation. To support the requirement, the physical nodes or control system 670 may determine an execution location for the application based on the location of the data. In some examples, the application may execute only on the processing systems of the physical nodes of system 100, however, it should be understood that control system 670 may represent a physical node capable of providing a platform for the execution of the application in some examples. Accordingly, if the required data for the application were located in sensor data store 681, the application may be deployed in a computing system of control system 670. In some implementations, the deployment of the application may comprise an initial deployment, but the deployment may comprise a migration of the application from one physical node to another physical node in the system.

In some implementations, in determining the location for the execution of the application, the system may consider the location of real-time data currently being obtained for the application, as well as the location of cached data for the application. This selection may be based on accessibility data, including latency, bandwidth, or some other accessibility information in obtaining the required data from the data source. Further, the physical node for the application may be selected based on other factors, including processing requirements of the application, communication requirements of the application, or some other similar factor related to the physical resource requirements of the application.

Figure 7:
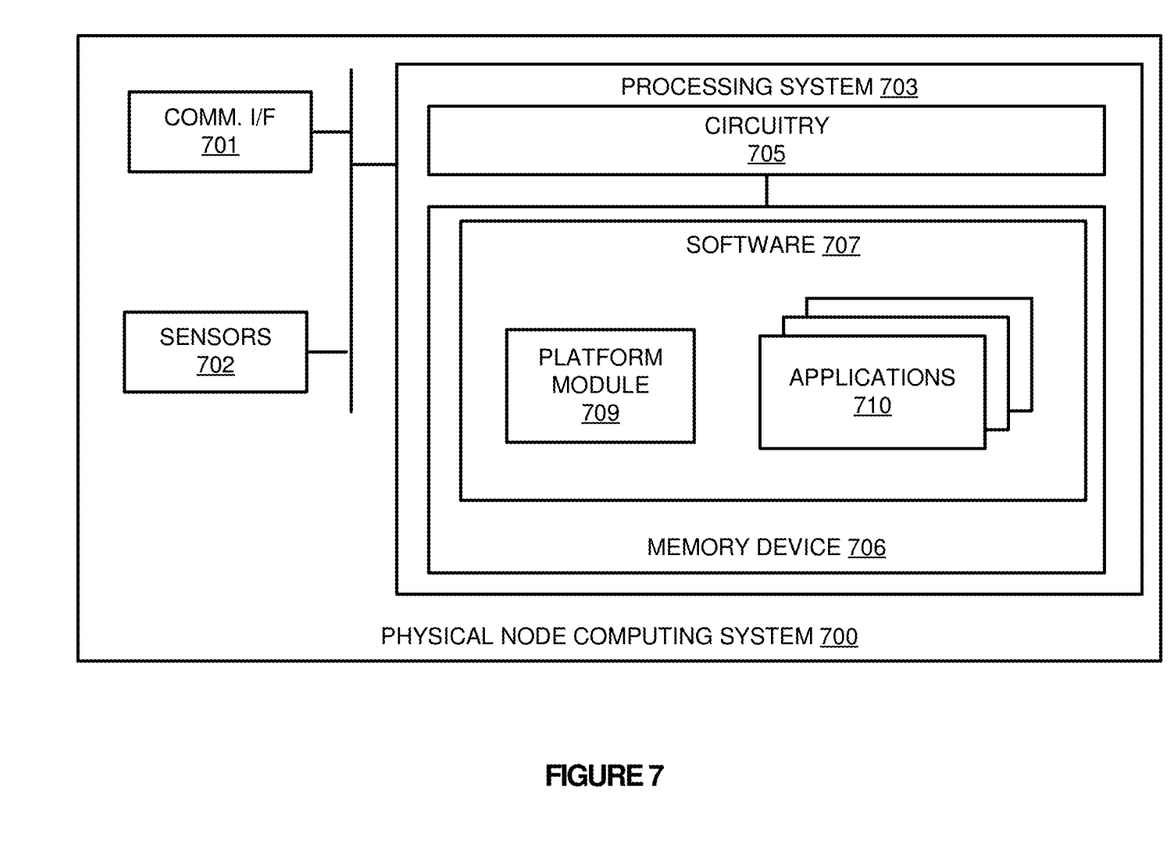
FIG. 7 illustrates a physical node computing system according to an implementation.

FIG. 7 illustrates a physical node computing system 700 according to an implementation. Computing system 700 is representative of any computing system or systems with which the various operational architectures, processes, scenarios, and sequences disclosed herein for a physical node may be implemented. Computing system 700 is an example of physical nodes 110-112 and 130-132 in FIG. 1, although other examples can be employed. Computing system 700 comprises communication interface 701, sensors 702, and processing system 703. Processing system 703 is linked to communication interface 701 and sensors 702. Sensors 702 may comprise imaging sensors, heat sensors, proximity sensors, acoustic sensors, vibration sensors, light sensors, or some other similar type of sensor. Processing system 703 includes processing circuitry 705 and memory device 706 that stores operating software 707. Computing system 700 may include other components such as a power system, photovoltaic solar panels, battery, and enclosure that are not shown for clarity.

Communication interface 701 comprises components that communicate over communication links, such as network cards, ports, radio frequency (RF), processing circuitry and software, or some other communication devices. Communication interface 701 may be configured to communicate over conductive, wireless, or optical links. Communication interface 701 may be configured to use Time Division Multiplex (TDM), Code Division Multiplex (CDM), Internet Protocol (IP), Ethernet, optical networking, wireless protocols, communication signaling, or some other communication format, including combinations thereof. In at least one implementation, communication interface 701 may be used to communicate with a control system and one or more other physical nodes in a converged system, where the physical nodes may comprise mobile or stationary devices, such as satellites, drones, airplanes, or balloons, land and water vehicles, stationary surface or sub-surface nodes, or some other devices.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes platform module 709 and applications 710, although any number of software modules may provide a similar operation. Operating software 707 may further include an operating system, utilities, drivers, network interfaces, applications, or some other type of software. When executed by processing circuitry 705, operating software 707 directs processing system 703 to operate computing system 700 as described herein.

In one implementation, platform module 709 is used to provide an operational platform for applications 710, wherein applications 710 may provide military and civilian observation operations, communications operations, navigation operations, weather operations, and research operations. In providing the platform, platform module 709 may be used to provide various resources to each of the applications including processing resources, storage resources, communication resources and sensor resources. In at least one example, applications 710 may execute as part of one or more logical nodes, wherein the logical nodes may comprise virtual machines, containers, or some other virtual or logical endpoint. The logical nodes may be allocated the required resources from platform module 709 based on the requirements of the applications, and may each be allocated separate file systems, storage resources, access to the processing system, access to the sensors, or some other similar resource allocation.

In addition to providing a platform for applications 710, platform module 709 may further work with one or more other physical nodes of the system, and a control system in some examples, to determine how applications are deployed in the system of physical nodes. In at least one example, platform module 709 may determine when an application is to be deployed in the system and determine one or more physical nodes that obtain sensor data associated with the application. Once the physical nodes with sensor data are identified, platform module 709 may determine accessibility related to the ability of physical nodes in accessing the required data and select a physical node for the application based at least in part on the accessibility data.

In some implementations, platform module 709 may determine the ability of computing system 700 to access the required data and provide the accessibility data to a control system (or other physical node) to determine the deployment of the application. In other implementations, other physical nodes may provide accessibility data corresponding to the required sensor data to computing system 700 to permit computing system 700 to determine which of the physical nodes should be allocated the application.

Although described in the previous example using only accessibility data to determine the deployment of the application, other factors may be considered including the processing and communication resource requirements of the application, any data storage requirements of the application (including previously identified sensor data) or some other similar requirement. Moreover, while the operations described above reference a physical node, similar operations may be performed by a ground control system, wherein the ground control system may obtain accessibility data related to an application's data and determine a location for the execution of the application, which may include executing the application on the ground control system in some examples.

In some implementations, the operations of deploying an application may be used in migrating an application from a first execution location to a second execution location. For example, an application executing on a first physical node may determine that the data for the application no longer is accessible or meets accessibility criteria for the application. As a result, accessibility data for one or more other physical nodes may be used to determine a new execution location for the application.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
    identifying an application associated with sensing an object of interest;
    identifying one or more physical nodes of a plurality of physical nodes comprising airborne nodes or spaceborne nodes able to provide sensor data associated with the object of interest, wherein a first portion of the sensor data from a first sensor and a second portion of the sensor data from a second sensor correspond to the object of interest;
determining accessibility data for the plurality of physical nodes to access the sensor data for the application from the one or more physical nodes, wherein the accessibility data comprises quality of service relating to at least data throughput information associated with accessing the sensor data;
determining whether the first portion or the second portion provide a better quality of service; and
deploying the application to at least one physical node of the plurality of physical nodes based on the accessibility data by at least selecting the at least one physical node as providing a better quality of service for access to either the first portion or the second portion.

2. The method of claim 1 further comprising collecting the sensor data associated with the application and additional sensor data associated with one or more other applications from sensors on the plurality of physical nodes.

3. The method of claim 1, wherein the accessibility data further comprises latency data for accessing the sensor data associated with the application.

4. The method of claim 1, wherein the accessibility data further comprises next hop reachability data for accessing the sensor data associated with the application.

5. The method of claim 1 further comprising:
identifying processing resource availability data for the plurality of physical nodes; and
wherein deploying the application to the at least one physical node of the plurality of physical nodes is further based on the processing resource availability data.

6. The method of claim 1 further comprising:
identifying a quality of service required by the application; and
wherein deploying the application to the at least one physical node physical node of the plurality of physical nodes is further based on the quality of service required by the application.

7. The method of claim 1, wherein identifying the one or more physical nodes of the plurality of physical nodes with the sensor data:
identifying sensor coverage regions for the plurality of physical nodes; and
identifying the one or more physical nodes of the plurality of physical nodes with sensor coverage regions that encompass the object of interest.

8. The method of claim 1:
wherein the first sensor and the second sensor are of a same sensor type.

9. The method of claim 1 further comprising:
identifying a data store with at least a portion of the sensor data related to the application;
determining second accessibility data for the plurality of physical nodes to access the data store; and
wherein deploying the application to the at least one physical node of the plurality of physical nodes is further based on the second accessibility data.

10. A computing apparatus comprising:
one or more non-transitory computer readable storage media;
a processing system operatively coupled to the one or more non-transitory computer readable storage media; and
program instructions stored on the one or more non-transitory computer readable storage media that, when executed by the processing system, direct the processing system to:
identify an application associated with sensing an object of interest;
identify one or more physical nodes of a plurality of physical nodes comprising airborne nodes or spaceborne nodes able to provide sensor data associated with the object of interest, wherein a first portion of the sensor data from a first sensor and a second portion of the sensor data from a second sensor correspond to the object of interest;
determine accessibility data for the plurality of physical nodes to access the sensor data for the application from the one or more physical nodes, wherein the accessibility data comprises quality of service relating to at least data throughput information associated with accessing the sensor data;
determining whether the first portion or the second portion provide a better quality of service; and
deploy the application to at least one physical node of the plurality of physical nodes based on the accessibility data by at least selecting the at least one physical node as providing a better quality of service for access to either the first portion or the second portion.

11. The computing apparatus of claim 10, wherein the program instructions further direct the processing system to collect the sensor data associated with the application and additional sensor data associated with one or more other applications from the sensors of the plurality of physical nodes.

12. The computing apparatus of claim 10, wherein the accessibility data further comprises latency data for accessing the sensor data associated with the application.

13. The computing apparatus of claim 10, wherein the accessibility data further comprises next hop reachability data for accessing the sensor data associated with the application.

14. The computing apparatus of claim 10, wherein the program instructions further direct the processing system to:
identify processing resource availability data for the plurality of physical nodes; and
wherein deploying the application to the at least one physical node of the plurality of physical nodes is further based on the processing resource availability data.

15. The computing apparatus of claim 10, wherein the program instructions further direct the processing system to:
identify a quality of service required by the application; and
wherein deploying the application to the at least one physical node of the plurality of physical nodes is further based on the quality of service required by the application.

16. The computing apparatus of claim 10,
wherein the first sensor and the second sensor are of a same sensor type.

17. The computing apparatus of claim 10, wherein the program instructions further direct the processing system to:
identify a data store with at least a portion of the sensor data related to the application;
determine second accessibility data for the plurality of physical nodes to access the data store; and wherein deploying the application to the at least one physical node of the plurality of physical nodes is further based on the second accessibility data.

18. The computing apparatus of claim 10, wherein the program instructions further direct the processing system to:
determine when the application executing on a first physical node fails to meet accessibility criteria for the sensor data; and
when the application executing on the first physical node fails to meet the accessibility criteria for the sensor data, triggering the determination of the accessibility data.

19. A system comprising:
a plurality of physical nodes; and
a control system configured to:
identify an application associated with sensing an object of interest;
identify one or more physical nodes of the plurality of physical nodes comprising airborne nodes or spaceborne nodes able to provide sensor data associated with the object of interest, wherein a first portion of the sensor data from a first sensor and a second portion of the sensor data from a second sensor correspond to the object of interest;
obtain accessibility data for the plurality of physical nodes to access the sensor data for the application from the one or more physical nodes, wherein the accessibility data comprises quality of service relating to at least data throughput information associated with accessing the sensor data;
determining whether the first portion or the second portion provide a better quality of service; and
deploy the application to at least one physical node of the plurality of physical nodes based on the accessibility data by at least selecting the at least one physical node as providing a better quality of service for access to either the first portion or the second portion.

20. The system of claim 19, wherein the accessibility data further comprises latency data for accessing the sensor data associated with the application.

* * * * *